United States Patent [19]

Capozzi

[11] 4,298,929
[45] Nov. 3, 1981

[54] INTEGRATED MULTILEVEL STORAGE HIERARCHY FOR A DATA PROCESSING SYSTEM WITH IMPROVED CHANNEL TO MEMORY WRITE CAPABILITY

[75] Inventor: Anthony J. Capozzi, Binghamton, N.Y.

[73] Assignee: International Business Machines Corporation, Armonk, N.Y.

[21] Appl. No.: 6,980

[22] Filed: Jan. 26, 1979

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,569,938 | 3/1971 | Eden | 364/200 |
| 3,588,829 | 6/1971 | Boland et al. | 364/200 |
| 3,864,669 | 2/1975 | Schlickeiser et al. | 364/900 |
| 3,866,183 | 2/1975 | Lange | 364/200 |
| 3,896,419 | 7/1975 | Lange et al. | 364/200 |
| 3,967,247 | 6/1976 | Andersen et al. | 364/200 |
| 4,056,845 | 11/1977 | Churchill Jr. | 364/200 |
| 4,071,910 | 1/1978 | Stockebrand et al. | 364/900 |
| 4,084,234 | 4/1978 | Calle et al. | 364/200 |
| 4,084,258 | 4/1978 | Bluethman | 364/900 |

*Primary Examiner*—Gareth D. Shaw
*Assistant Examiner*—David Y. Eng
*Attorney, Agent, or Firm*—Elmer W. Galbi

[57] ABSTRACT

A data processing system including at least one channel and a multilevel store has the capability of performing a channel write to main memory where the data to be written into main memory crosses a double word boundary in a partial write store. The partial write store is accomplished by a merge operation which takes place in the memory system in a manner such that the main processor, channel and a cache store are freed up for further operation prior to the completion of the write to main memory.

1 Claim, 8 Drawing Figures

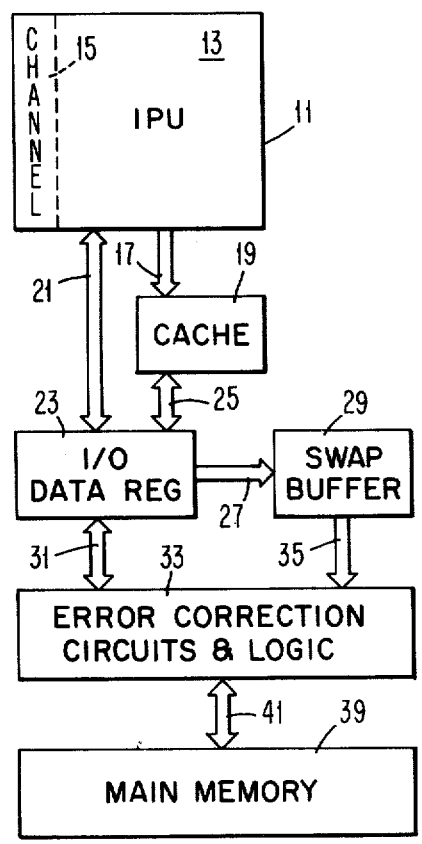
FIG. 1
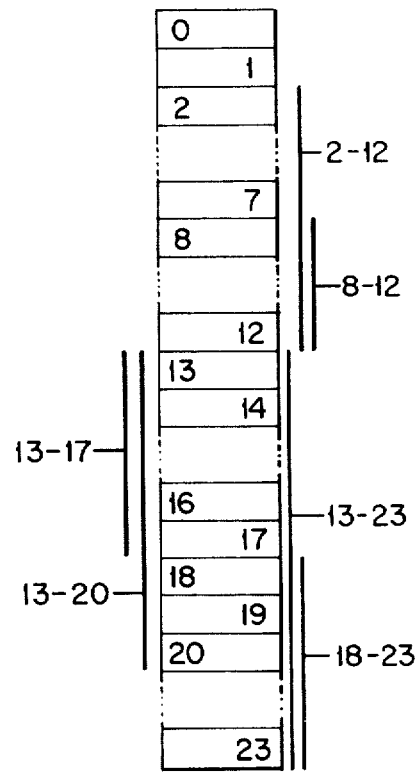
FIG. 2
| SAR | 18 | 19 | 20 | 21 | 22 | 23 | |
|---|---|---|---|---|---|---|---|
| START ADDR | 0 | 1 | 1 | 1 | 0 | 1 | DW3/BYTE 5 |
| STOP ADDR | 1 | 1 | 0 | 0 | 0 | 1 | DW6/BYTE 1 |
FIG. 5
|   | 0 | 1 | 2 | 3 | 4 | 5 | 6 |
|---|---|---|---|---|---|---|---|
| 0 | X | X | X | X | X | X | X |
| 1 | X | X | X | X | X | X | X |
| 2 | X | X | X | X | X | X | X |
| 3 | X | X | X | X | O | O | O |
| 4 | O | O | O | O | O | O | O |
| 5 | O | O | O | O | O | O | O |
| 6 | O | O | X | X | X | X | X |
| 7 | X | X | X | X | X | X | X |
FIG. 8

INTEGRATED MULTILEVEL STORAGE HIERARCHY FOR A DATA PROCESSING SYSTEM WITH IMPROVED CHANNEL TO MEMORY WRITE CAPABILITY

BACKGROUND OF THE INVENTION

Field of the Invention

This invention relates generally to data processing systems and more particularly to a data processing system having a multilevel memory including at least a first, small, high speed cache memory and one or more large, relatively slower main memories with an integrated control system therefor, having an improved channel to memory write system. The system of the present invention includes a swap buffer whereby data from the channel goes through the IPU to the swap buffer. Thereafter, the IPU is freed to do other work while the swap buffer obtains any needed half-word information from the main memory or from the cache and thereafter stores the new information in the main memory. This significantly increases overall system performance since the IPU can proceed with other work during the reading of information to complete storage requests which cross half-word boundaries.

CROSS REFERENCE TO RELATED APPLICATION

Reference is made herein to copending application Ser. No. 955,031 filed Oct. 26, 1978, entitled "Integrated Multilevel Storage Hierarchy for a Data Processing System" and assigned to the same assignee as the present application.

Description of the Prior Art

Large data processing systems have processors with substantially increased operating speeds, which has resulted in the need for larger, readily accessible memory systems. In order to fully utilize the increased system operating speeds, it is necessary that the memory or some component thereof, operate at a speed reasonably close to the speed of the processing unit or units. However, it is extremely difficult to reliably randomly access a block of data in a large memory space at high operating speeds in an economical manner.

A solution to the problem is to use a two or more level storage hierarchy including a small, fast cache memory store (hereinafter referred to as a cache) and a large, relatively slower main memory or memories. The system processor unit communicates directly with the cache at essentially system speed. If data requested by the processor unit is not in the cache, it must be found in the main memories and transferred to the cache, where it generally replaces an existing block of data.

In order for a cache based system to be effective, there must be a highly efficient control store system to accomplish data transfer between the main memories, cache, channels, etc. and to control any data inputs from the system (channels, processing unit, etc.) to the cache or main memories. If the transfer of data is not handled efficiently, many of the advantages of using a high speed cache will be lost.

A particular problem can arise when performing or attempting to perform a data write from a channel to the memory, especially if the data to be written is a partial word write across a double word boundary. In most systems, the protocol will not allow a partial write across a double word boundary, thereby limiting the system flexibility. In other systems such write operations are permitted, but all data merges must take place in the cache, regardless of whether or not the addressed location is resident in the cache. This requires the full use of the cache, and usually the central processing unit, during the write operation. Furthermore, it requires the utilization of at least one cache page, which could otherwise be used for operating data.

Still another method previously used is to merge the data in the channel hardware. This requires sending the to be merged data from the cache or main memory back to the channel. However, this method is very time consuming and, accordingly, degrades system performance.

Another disadvantage of such a system is that the various clocks (channel, main memory, cache and processor) must be in sync using the same number of pulse words and the same clock cycles. This, of course, presents design constraints and may result in some inefficiencies in one or more of the subsystems.

A typical cache based, multilevel storage system is described in U.S. Pat. No. 3,896,419. The described system uses a cache store located in the processor to provide a fast access look-aside store to blocks of data previously fetched from the main memory store. The system described does not, however, discuss procedures or processes for cross boundary writes from a channel to the main memory.

Objects and Summary of the Invention

Accordingly, it is a principal object of the present invention to provide an improved multilevel memory store for a data processing system which overcomes the foregoing disadvantages of the prior art.

Yet another object of the present invention is to provide a multilevel memory storage system having improved operating speed and increased reliability.

Another object of the present invention is to provide a multilevel memory store for a data processing system having a single storage control mechanism, which permits effective partial write operations across a double word boundary from a channel to main memory.

The foregoing and other objects and advantages are accomplished according to one aspect of the invention by utilizing a two-level memory system having a single integrated control to accomplish data transfers within the system. The memory includes a relatively small, high speed cache adapted to work with the processor at processor speeds and a relatively large, but slower main memory. In operation for a channel to main memory partial write across a double word boundary, it is first determined if the address to which the data is to be written is in the cache. If the data address is in the cache, the data from the channel is merged with the full page of double words of data from the cache in a data register and the updated, merged cache page is stored in the main memory. Simultaneously, the page in cache is invalidated. If the data address is not in the cache, the data from the channel is read through the IPU and data register and stored in a swap buffer (thereafter the IPU and cache are free to perform other operations). Then the double words related to the partial writes are brought from the main memory and stored in auxilary registers in the storage system. Thereafter they are merged with the partial double words in the swap buffer from the channel and the updated data is stored back in the main memory.

DESCRIPTION OF THE DRAWINGS

FIG. 1 is a block diagram illustrating the data flow for a bilevel memory system in which the present invention finds utility;

FIG. 2 is a block representation of the address partitioning of a storage address register used in a store controller according to the present invention;

FIG. 5 is a table illustrating a start and end address corresponding to a partial, cross double word boundary selection;

FIG. 8 is a diagrammatic representation of a full page of data including a partial write therein.

DESCRIPTION OF THE PREFERRED EMBODIMENT

Figure 3:
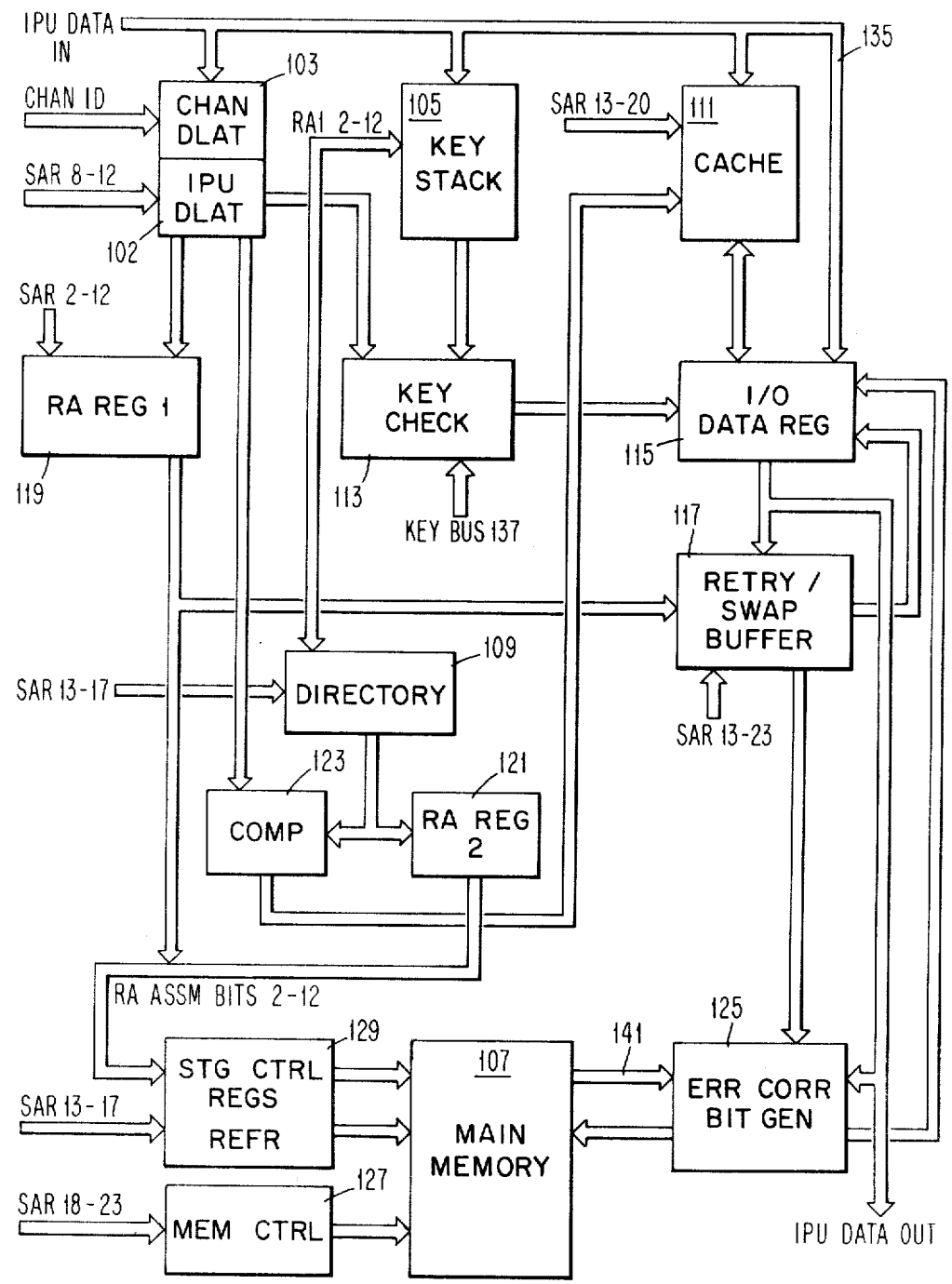
FIG. 3 is a detailed block diagram illustrating the storage control for a data processor system according to the present invention.

The foregoing and other objects, features and advantages of the present invention will become more apparent from the following particular description of a preferred embodiment of the invention taken in conjunction with the above-described drawings.

The data flow for a bilevel memory system incorporating the present invention is illustrated in FIG. 1. The system generically consists of a main processor 11, including the instruction processing unit (IPU) 13 and the attached channels 15. A data path 17 connects the output of the IPU to a cache memory 19. A bidirectional data path 21 connects the IPU to an I/O data register 23. Yet another bidirectional data path 25 interconnects the cache and the I/O data register. The I/O data register 23 has a unidirectional data path 27 connecting it to a swap buffer 29, and a bidirectional data path 31 connecting to the error correction circuits and logic 33. The swap buffer 29 is connected to the error correction circuits and logic by a unidirectional data path 35. The error correction circuits and logic 33 are returned to the I/O data register by the data path 31 and are connected to the main memory by main memory 39 by a bidirectional data path 41. FIG. 1, therefore, represents the general data paths that are permitted in the transfer of data between the various components of the system, especially as they are relevant to the present invention.

Referring next to FIG. 2 therein is illustrated a 24-bit addressing mechanism of the type that may be found applicable for the system of the present invention. In a typical system, this would be identified as the address of a storage address register that is used to control the addressing of various controls in the system. In a typical configuration, the bits 2-12 would define the real address of a 2K page in memory, bits 13-17 define a cache page address, bits 18-20 define an 8-byte line of a cache page and bits 21-23 define a byte within a given line. The address partitioning importance becomes more apparent when seen in connection with the description of the addressing means inherent in the configuration of FIG. 4. In connection with the present invention, we will be primarily concerned with bits 18-23, since each channel to memory write will not exceed a page in length.

In FIG. 3, the various components of the store controller for a bilevel system and its relation to the cache and main memory are illustrated. The storage data flow is as indicated. The system includes a processor directory look-aside table (DLAT) 102 and a channel directory look-aside table 103 with the processor DLAT having each entry containing a virtual and real address field, along with a fetch and status bit. The channel DLAT component contains the entries for channel virtual to real addressing capability. The system also includes a key stack 105 with multiple entry components, each entry representing a given page in main store 107. The cache directory 109 contains a plurality of entries with multiple way associativity. For example, the cache directory might be four-way associative and, therefore, the cache 111 would contain four data areas. Each area of the cache 111 contains a plurality of cache pages and the cache is addressed by the storage address register. The system further includes a key check device 113, an input/output data register 115 and a swap buffer 117. There are two components of a real address register assembly 119 and 121, hereinafter referred to as RA1 and RA2. The controller additionally comprises a compare circuit 123 and an error correction/bit generator 125. A main memory controller 127 and storage control registers 129 interface with the main memory.

For purposes of illustration, it will be assumed that the main memory has a 2 meg storage capability, the cache 111 is an 8-byte by 1K entry facility containing the four data areas, with each area containing 32 cache pages or 256 lines. For such a system, the directory 109 will contain 128 entries with four-way associativity and the key stack is a 1K entry component with each entry representing a 2K page in main storage. The input/output data register 115 will be described as an 8-byte data transfer register, which both receives the processor data on a storage write and sends the data to the processor on a storage read operation. The input/output data register 115 also moves data between components in the storage controller.

The error correction/bit generator 125 provides the correct parity information on the main memory/cache data path. The directory 109 and the directory lookaside tables 102, 103 receive addressing via the storage address register, which, as previously described, is a 24 bit register used to address, via bit grouping, the components of the storage control section. The addresses thereof may be virtual or real. RA1 and RA2 register components 119 and 121 receive addresses from the processor DLAT 102 and the directory 109, respectively, and in conjunction with the SAR, address the main memory 107 via the storage control registers 129.

The cache directory 109 is addressed by storage address register bits 13-17 and specifies a 64-byte cache page. Each entry contains an 11 bit real address and 3 status bits, one bit indicating a valid or invalid status, a modification bit indicating the modify status and a bad entry bit indicating the physical condition of the cache entry. With the four-way associativity, four cache pages, belonging to four different 2K pages, reside concurrently in the cache 111. The source of the real address is the real address fields from the processor DLAT 102 or the storage address register, via RA1 component 119. The cache directory indicates if the desired page is in cache. If the real address is found to be in the directory, and its entry is valid, then the data is in cache. This is defined as a "hit". If the real address is not found in the directory or if its entry is valid, then the data is not in the cache and this is referred to as a data "miss". For a miss, it is necessary to access the main memory to bring the desired data therefrom to the cache.

The cache 111 is an 8K byte facility divided into four sections, defining the four-way associativity with the directory 109. Each section of the cache contains 32 entries of 64 bytes each. The cache receives data from the I/O data register 115 and from the IPU data bus 135. The output from the cache goes to the I/O data register 115. All four data areas of the cache will be addressed simultaneously by the storage address register with the SAR address bit field 13-17 addressing the page component and the SAR bit field 18-20 addressing the 8-byte line component. A final selection is made by the associativity class from the directory 109 that the directory hit occurred on.

In operation, 64-byte pages are loaded into the cache 111 from the main memory 107 only on those commands in which a directory "miss" trap may occur, with the data being transmitted via the I/O data register 115.

The swap buffer 117 stores one cache page at a time and is used to buffer the outgoing page from cache in an outpage operation and stores syndrome bits generated during a fetch from the main memory 107. The syndrome bits are used to identify any corrected data corrected by the error correction/bit generator 125 on any read from storage. The swap buffer is also used to buffer channel data on partial store operations, as will be hereinafter described in greater detail. A retry buffer (not shown) can be used to store those double words read from cache in a write operation prior to modification in which the cache is modified.

The key stack 105 has a plurality of entries, with each entry representing a 2K page in storage. Each entry contains a storage protection key, a fetch protection bit and a reference bit and change bit for the identified page. The input for the key stack array is from the I/O data bus. The output from the key stack 105 is checked with the key bus 137 or from the two key fields from the processor DLAT 102. The key stack also receives an input from the real address assembly component 119 using bits 2-12 thereof.

The main memory, which has a storage capacity typically on the order of megabytes, receives and sends data via the error correction/bit generator 125. The data is selected from the main memory based upon inputs from the memory controller 127, from the real address assembly units 119, 121 and from the storage address register. Data to and from the main memory is transferred 8 bytes at a time on an 8-byte bidirectional data bus connected between the error correction/bit generator and the main memory. In the configuration, according to the present invention, inputs from the channel will always be written directly into the main memory and will invalidate an old cache page having the same address, if it is contained in cache at the time the channel writes to memory. Conversely, the processor will always write into cache, which will then transfer data to the main memory if appropriate. Accordingly, the main memory clock and the channel clock will generally run in sync, for example, using four pulses in a 150 nanosecond cycle time. Also, the cache clock and the processor clock will run together and may be on either a 4, 6 or 8 pulse clock cycle.

As mentioned previously, the input/output data register 115 is an 8-byte register used to move data to and from the processor/channel and the store. The output of the data register may go to the cache input, to the processor data bus, to the swap buffer (or retry buffer) and to the error correction/bit generator. The data register may be set from the cache output, from the processor data bus, from the error correction/bit generator, from the key array, from the retry buffer and from the swap buffer.

The real address assembler is comprised of RA1 119 and RA2 121. RA1 is set from the storage address register or from the real address fields of the directory lookaside tables 102, 103. RA2 is set from the directory 109 real address entry that compares equal. With a DLAT "hit" and a directory "miss", the real address from RA1 is gated to the main memory 107. At the same time, SAR bits 13-17 are also gated to the main memory, with the address bits from RA1 addressing a selected 2K page and with bits 13-17 addressing the selected 64 bytes (cache page). The output of the real address assembly may also be gated to the input to the directory for loading the real address, to the key stack for reading or storing the key, or to the retry/swap buffer array for storing real addresses.

Figure 4:
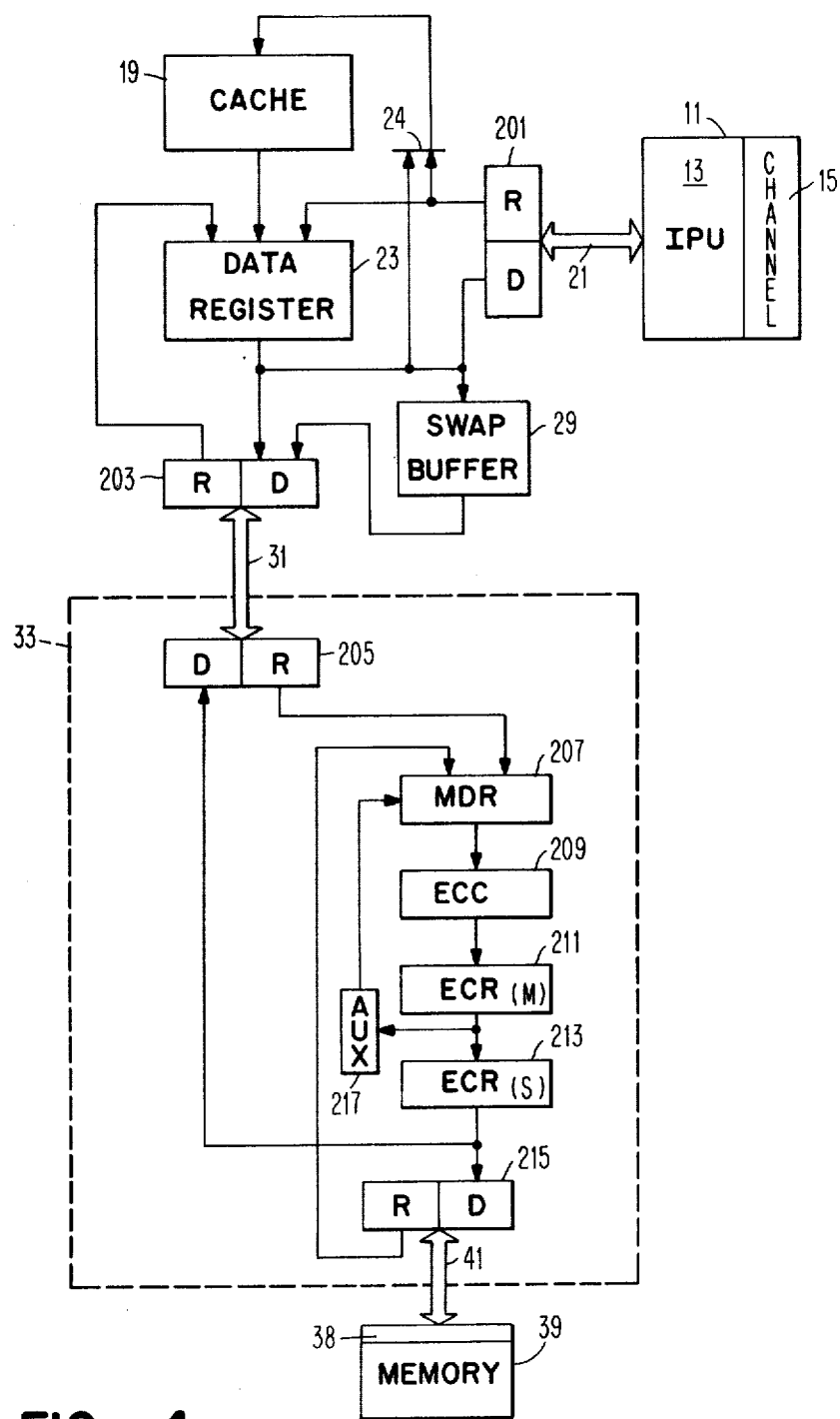
FIG. 4 is a detailed block diagram illustrating the data paths of a channel to memory write operation according to the present invention.

Referring next to FIG. 4, there is shown in greater detail the data paths followed during a write operation from the channel through the IPU to the main memory. Apparatus which is the same as that shown in FIG. 1 is labeled with the same letter designation. FIG. 4, however, expands the description of the actual data paths. As seen in FIG. 4, each bilateral data path actually terminates in a receiver/driver combination connected between the various devices. For example, the bidirectional path from the IPU to the system goes on line 21 to receiver/driver pair 201. The output from R201 then is applied to the cache 19 via gate 24 and to the data register 23. The return path from the data register 23 goes through the driver 201 to the bidirectional path 21 and to the IPU 13. Also, the output from the data register 23 may be sent to the cache 19 via gate 24. Similarly, a receiver/driver pair 203 connects the data register 23 and the swap buffer 29 to the bidirectional path 31 going to the error correction circuits and logic 33 which contains a terminating driver/receiver pair 205. The driver 203 receives inputs from the swap buffer and the data register and the receiver 203 provides an output to the data register 23. The receiver 205 provides an output to a memory data register 207 which in turn feeds the error correction circuitry 209. The output from the circuitry 209 is applied to a master error correction register 211, which in turn feeds a slave error correction register 213. The bidirectional data path 41 between buffer 38 of the main memory 39 and the error correction circuits and logic 33 terminates in a receiver/driver pair 215. The output from the slave error correction register 213 is applied to the driver 215 and the output from the receiver 215 is applied back to the memory data register 207. Another output from the master error correction register is applied to an auxiliary register 217, the output from which is applied back to the memory data register 207. Also, an output from the slave ECR 213 is applied to the driver 205.

To illustrate the invention, the following assumptions will be made. The cache 19 is an 8 kilobyte cache with four-way associativity, each of the four sections of the cache containing 32 pages. Each page within the cache contains 64 bytes being divided into 8 different cache lines. A double word consists of 8 bytes and corresponds to a full line in a cache page. The basic transfer is of a cache page dimension, that is, a 64-byte data transfer. For a full 64-byte transfer corresponding to a full cache page, when writing from the channel through the IPU to the main memory, the data is written directly to the buffer 38 of the main memory via data register 23 and error correction circuits and logic 3, bypassing the swap buffer 29. The buffer 38 of the main memory 39 may be, for example, a full 64-byte wide buffer. When a write full page operation from the channel through the IPU to the main memory occurs and if the data happened to be in cache, then an invalidate signal will be applied to the corresponding memory address in the cache for that page.

Since the channel data write command may be a variable length operation of from 1 to 64 bytes, there are other variations of a channel write other than the writing of a full page. One would consist of a partial write operation with the starting address and the stopping address coming on double word boundaries. In such a case, the partial writes are loaded into the swap buffer via the data register 23 and then are unloaded from the swap buffer to the buffer 38 of the main memory 39 by the error correction circuits and logic 33.

The more significant aspect of the present invention occurs when a partial write across the double word boundary occurs either with the address page being in cache or with the address page not being in cache. When the page is in cache, the entire page is read out from the cache, merged in the data register 23 with the partial data coming from the channel and loaded into the swap buffer from which it is sent through the error correction logic circuitry 33 to the buffer 38 of the main memory. Alternatively, the merged data from the data register 23 may be sent directly through the error correction logic circuitry 33 to the memory. A transfer warning signal is raised at the appropriate time to synchronize the merging of the channel data and the cache data. Since the cache is used in accomplishing the merge, the IPU is not free to continue operation until the merge has been completed, at which time an IPU complete signal will be given.

If a partial word write across a double word boundary is not in cache, then the to be merged double words must be prefetched from main memory. The access of the main memory begins during the time the channel data is being loaded into the swap buffer. In this instance, once the channel data is loaded into the swap buffer, the IPU complete signal is given and the IPU, channel and cache are free to continue with other operations. The actual merge takes place within the error correction circuits and logic in conjunction with the swap buffer and the data register. This provides the significant advantage of the present invention, since (a) partial writes across double word boundaries are permitted and (b) the major portion of the merge operation for data not in cache can be accomplished without tieing up the IPU any longer than is required.

Figure 6:
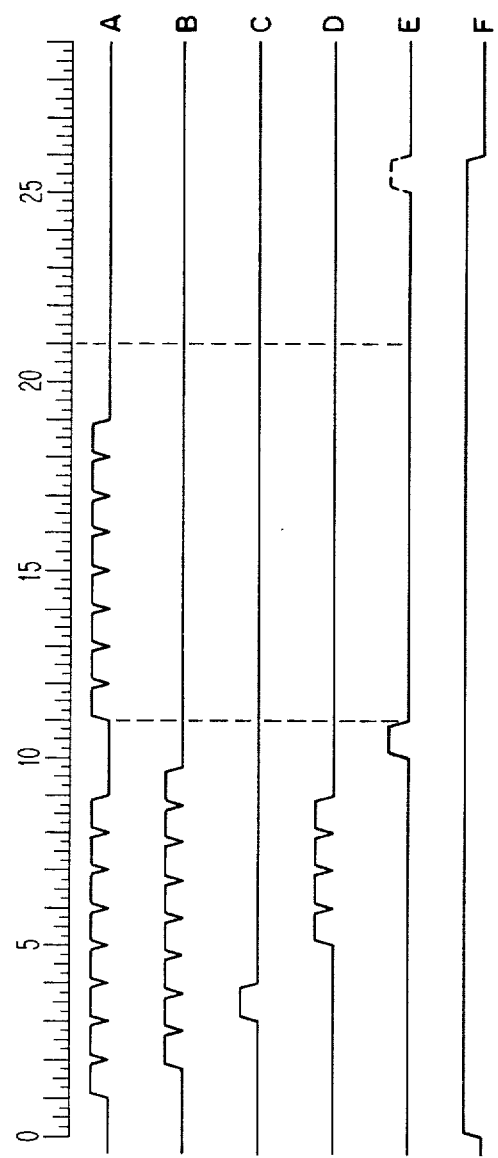
FIGS. 6 and 7 are timing diagrams of the sequence of events occurring for two types of channel to memory write operations according to the present invention.

To better illustrate the invention, an example will be given of a partial, cross boundary channel to memory write operation. The example will first be given for the situation when the data is located in the cache and the second situation when the data is not located in the cache. The illustration will be based upon the starting and stopping addresses illustrated in FIG. 5. The addresses are based upon storage address register bits 18 to 23 and will be a starting address 011101 which corresponds to double word 3, byte 5. The stop address is 110001, which corresponds to double word 6, byte 1. The positioning of these addresses is illustrated in FIG. 8 which shows the equivalent of a full cache page, that is, sixty-four bytes, which consists of eight double words, 0 to 7, each double word having eight bytes of information. The "X" byte areas refer to data which is not disturbed by the partial channel write operation and the "O" byte refer to those data bytes which are part of the channel write operation. It will first be assumed that the page containing the partial write data is contained in cache. A timing sequence relating to this is illustrated in FIG. 6 and will be discussed in conjunction with the circuit diagram of FIG. 4. Once the operation is allowed to begin, the first signal is a memory busy signal as indicated in line F of FIG. 6. This signal will be up for the full duration of the data transfer, since the memory will be engaged during the entirety of the transfer. Since the data is found to be in the cache, the entire cache page must be read out from the cache, passed through the data register, where the partial write data from the channel is merged therewith, and then stored in the swap buffer until the entire cache page is read out, following which the swap buffer will be unloaded and the data will be stored in the memory. At the same time, the address corresponding to that cache page will be invalidated. The reason the entire cache page must be read out is that some of the data in that cache page may have been changed or updated during previous operations, which would mean that the data in memory corresponding to that cache page would no longer be valid. Therefore, it is necessary to update the entire cache page and store it in the main memory.

As indicated in line A of FIG. 6, one clock cycle after the memory busy signal has been raised, begins the addressing of the data from the cache to be sent to and through the data register. As indicated in line B of FIG. 6, approximately three clock pulses after the first data address pulse has been raised, the first double word from the cache is read into the data register. Since this double word O is not to be merged in the data register, it is transferred directly into the swap buffer 29. This operation continues until the third subsequent system cycle when, as illustrated in line C of FIG. 6, a channel warning pulse is sent to tell the channel to get ready to send its data. At one system cycle after the channel warning pulse has been sent, and as indicated on line D of FIG. 6, the channel begins sending the data and the first data sent from the channel will be that corresponding to double word 3. In this case, only bytes 5, 6 and 7 of double word 3 are modifying the double word 3 from the cache, so that by the setting of appropriate write flags in the data register, the merge is effected and then the new double word 3 with the merged data of bytes 0-4 from the cache and 5, 6 and 7 from the channel is transferred to the swap buffer 29. This continues for the writing of double words 4 and 5 from the channel, the merging of double word 6 and then thereafter the unmodified double word 7 from the cache completes the transfer to the swap buffer. Accordingly, as indicated on line E of FIG. 6, an IPU complete pulse is raised which informs the IPU that the cache and data registers are free for further use. The remainder of the store operation will be completed in the memory itself. As indicated in FIG. 6, the initial channel to memory write operation has taken eleven machine cycles.

The next portion of the operation is to unload the swap buffer and write the data therein into the main memory. As indicated on line A of FIG. 6, this takes about ten machine cycles since the data must be moved through the receiver driver 203 to the driver receiver 205, through the memory data register 207, the error correction circuitry 209 and to the error correction master register 211. The data is continued to be transferred through the slave error correction register 213 through the receiver driver 215 and directional transmission line 41 to the buffer 38 of the memory 39. Approximately four machine cycles after the swap buffer has been unloaded and transferred to memory, the busy memory signal indicated on line F of FIG. 6 is dropped and a second IPU complete pulse on line E may be issued. A second IPU complete pulse is needed only if during the interim time, a memory request had been received. Such a memory request would have been responded to with a busy signal and the IPU would have to wait until a complete pulse is received before it could again access the memory.

While the entire data transfer operation occupied twenty-six machine cycles, only during eleven of these cycles was the IPU prevented from carrying on additional processing. Therefore, during the latter fifteen machine cycles, the IPU 11, the cache 19 and the data register 23 were free to perform additional operations. The last seven cycles of the operation are required to move the data through the error correction logic circuitry to the memory buffer 38 and from the memory buffer 38 into the memory 39.

Figure 7:
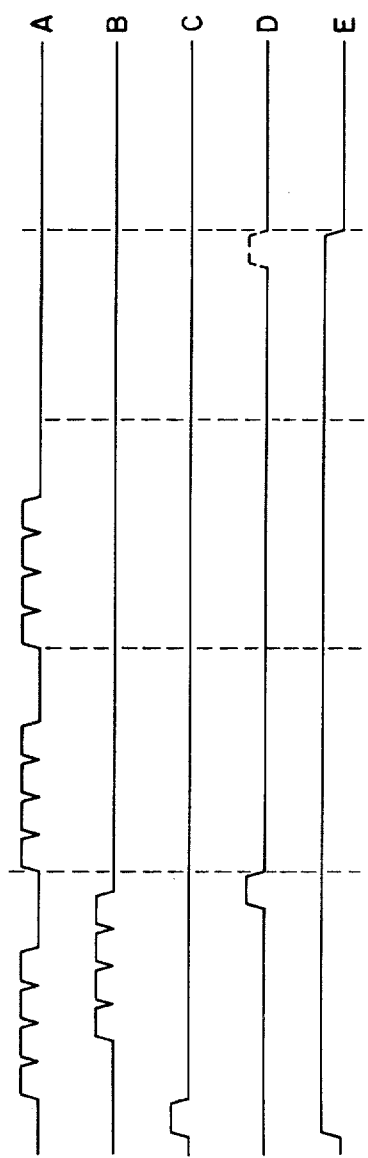

The timing diagrams of FIG. 7 depict a partial store with the same start and stop address as previously described except that the page containing the data is not located in cache. Therefore, double word 3 and double word 6 of the corresponding page must be prefetched from main memory to permit the total double word merger as required. As illustrated in FIG. 7, only four double words, 3 through 6, are affected by this operation so that the timing sequence has an even further time improvement over that illustrated in FIG. 6.

Again, as indicated on line E of FIG. 7, the first signal raised is a memory busy signal. At about the same time, the channel warning pulse is sent as indicated on line C of FIG. 7 since the data transfer is initiated initially from the channel since the cache is not being accessed. One machine cycle thereafter the data transfer pulses are initiated and shortly thereafter the first of the affected double words are resident in the data register 23. This is illustrated by line B of FIG. 7. During this same operation, the memory has been addressed and the corresponding memory data is being accessed and loaded in the memory buffer 38. During the four machine cycles, the data from the channel is transferred to the swap buffer. One cycle after the end of this transfer, as indicated on line D of FIG. 6, an IPU complete signal is given, freeing the IPU, cache and other circuitry to perform other operations. As can be seen, this has required only seven machine cycles to load the information into the swap buffer. With the swap buffer appropriately loaded, on the eighth machine cycle, the double words 3 and 6 are fetched from the memory, as illustrated in line A of FIG. 7. While only two double words are being prefetched, it still requires four machine cycles since double words 4 and 5 are clocked but not read. During this time, double word 3 is fetched from the memory buffer 38 and placed in the auxiliary register 217 and double word 6 is fetched from the buffer and placed in the master error correction register 211. Following this operation and beginning with about the thirteenth machine cycle, the unloading of the swap buffer is begun. First, double word 3 from the swap buffer and double word 3 stored in the auxiliary buffer 217 are merged in the memory data register 207 and then moved through the error correction circuitry 209. At the same time, double word 6 stored in the master error correction register 211 is transferred to the auxiliary register 217. A sequential operation continues with next double word 4 being transferred from the swap buffer through the receiver driver 203 to the driver receiver 205 and through the master memory data register 207. This operation continues until double word 6 is required, at which time double word 6 is read from the auxiliary register 217 and merged with double word 6 from the swap buffer 29 in the master memory data register 207. Following the unloading of the swap buffer, the memory requires about the same amount of time for the data transfer and buffer unloading as for the operation illustrated in FIG. 6. Thereafter, as indicated in line E of FIG. 7, the busy memory signal is dropped. Again, if an interim memory request has been received, the system will generate another IPU complete pulse as illustrated in line D of FIG. 7.

All of the exact timing details are not shown as they may differ from system to system. A particular example of timing occurring during data transfer may be found in copending application, Ser. No. 955,031, entitled "Integrated Multilevel Storage Hierarchy for a Data Processing System".

From the foregoing, it is readily apparent that applicant has provided an integrated multilevel storage hierarchy for a data processing system with improved channel to memory write capability. Using the concept it is possible to have partial write operations across double word boundaries and the operations are accomplished in a manner which minimizes the required processor time, thereby enhancing system performance.

It will be readily apparent to those skilled in the art that various modifications and changes can be made to the foregoing without departing from the spirit or scope of the invention. It is, therefore, intended that the invention not be limited to the specifics of the foregoing description of the preferred embodiment, but rather is to embrace the full scope of the appended claims.

Having thus described my invention, what I claim as new, and desire to secure by Letters Patent is:

1. In a data processing system including a processing unit, at least one channel connected to said processing unit, a first high speed, low capacity memory cache, a second lower speed, high capacity main memory and an input/output register interconnecting said cache and said processing unit, wherein data is stored in said main memory in the form of full words, each full word comprising a particular number of bytes and having an upper and lower boundary, and wherein data is stored in said cache in the form of cache pages each page comprising a plurality of full words, said channel providing input data for storage in said main memory, said input data being either in the form of full words whose boundaries correspond to boundaries of full words in said main memory or in the form of partial words which have less bytes than said particular number of bytes and the boundaries of which do not coincide with the boundaries of full words in main memory, improved channel to memory write means for storing information in said main memory in response to a partial channel write request wherein the data supplied by said channel and loaded into said I-O register includes a partial word whose boundaries do not coincide with the boundaries of a full word in said main memory, comprising:

a swap buffer adapted to receive data from said input-/output register and having at least one cache page storage capability;

an error correction circuit and logic subassembly connected between said input/output register and said main memory, said subassembly adapted to receive data from said swap buffer;

means responsive to a partial channel write request to determine if the data addressed by the channel write request is in said cache (a hit) or if the data addressed is not in said cache (a miss);

first means responsive to a hit to generate a full word by retrieving the addressed data from the cache and supplementing the partial word from said partial channel write request with the data from the cache in said I-O register a plurality of bytes at a time;

means responsive to said first means to transfer said full word generated by said first means to said main memory;

second means responsive to a miss to release said IPU to load said partial word from said I-O register into said swap buffer to retrieve the addressed data from said main memory and to combine the data from said partial channel write stored in said swap buffer with data from main memory; in said error correction circuits and logic subassembly, and means responsive to said second means to store said combined full word to said main memory, whereby said IPU is available for executing instructions unrelated to channel data transfers, while information to complete partial channel write requests is being retrieved and while said data is being transferred from said swap buffer to said memory.

* * * * *